US008458676B2

(12) United States Patent
Asai et al.

(10) Patent No.: US 8,458,676 B2
(45) Date of Patent: Jun. 4, 2013

(54) EXECUTING PLATFORM-INDEPENDENT CODE ON MULTI-CORE HETEROGENEOUS PROCESSORS

(75) Inventors: Nobuhiro Asai, Setagaya-ku (JP); Andrew B. Cornwall, Phoenix, AZ (US); Rajan Raman, Bangalore (IN); Akira Saitoh, Yamato (JP); Ravi Shah, Laveen, AZ (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 12/495,008

(22) Filed: Jun. 30, 2009

(65) Prior Publication Data

US 2010/0333075 A1 Dec. 30, 2010

(51) Int. Cl.
*G06F 9/44* (2006.01)
*G06F 9/445* (2006.01)

(52) U.S. Cl.
USPC ............................ 717/139; 717/140; 717/143

(58) Field of Classification Search
USPC .................................................. 717/136–148
See application file for complete search history.

(56) References Cited

U.S. PATENT DOCUMENTS

| | | | | |
|---|---|---|---|---|
| 5,854,927 A * | 12/1998 | Gelissen | ........................ | 717/139 |
| 5,923,892 A * | 7/1999 | Levy | ............................... | 712/31 |
| 6,691,306 B1 * | 2/2004 | Cohen et al. | ................... | 717/139 |
| 6,738,965 B1 * | 5/2004 | Webster | ......................... | 717/128 |
| 6,738,969 B2 * | 5/2004 | Bak et al. | ....................... | 717/158 |
| 6,792,600 B1 * | 9/2004 | Blandy | .......................... | 717/140 |
| 6,865,733 B2 * | 3/2005 | Broussard | ...................... | 717/147 |
| 6,883,165 B1 * | 4/2005 | Blandy et al. | .................. | 717/148 |
| 6,898,786 B1 * | 5/2005 | Sokolov | ......................... | 717/139 |
| 7,055,142 B2 * | 5/2006 | Meredith et al. | ............... | 717/136 |
| 7,080,363 B2 * | 7/2006 | Yellin et al. | .................... | 717/139 |
| 7,117,487 B2 * | 10/2006 | Meredith et al. | ............... | 717/143 |
| 7,124,407 B1 * | 10/2006 | Wallman | ........................ | 717/154 |
| 7,146,613 B2 * | 12/2006 | Chauvel et al. | .................... | 718/1 |
| 7,152,228 B2 * | 12/2006 | Goodwin et al. | .............. | 717/146 |
| 7,181,732 B2 * | 2/2007 | Bak et al. | ........................ | 717/140 |
| 7,337,436 B2 * | 2/2008 | Chu et al. | ........................ | 717/140 |
| 7,562,353 B2 * | 7/2009 | Bedner et al. | ................... | 717/140 |
| 7,577,946 B2 * | 8/2009 | Murakami et al. | ............. | 717/145 |
| 7,587,712 B2 * | 9/2009 | Mountain et al. | ............... | 717/148 |
| 7,770,152 B1 * | 8/2010 | Kamen et al. | ................... | 717/127 |
| 8,099,720 B2 * | 1/2012 | Sedukhin et al. | ............... | 717/139 |

OTHER PUBLICATIONS

Karrenberg et al, "Whole function vectorization", IEEE, pp. 141-150, 2011.*
Yano et al, "Platform independent integrated environment for simulation and real time control experiment", IEEE, pp. 411-416, 2006.*
Binder et al, "Advanced Java Bytecode Instrumentation", ACM PPPJ, pp. 135-144, 2007.*
Mostl et al, "Including real life application code into power aware network simulation", ACM SIMUTools, pp. 1-6, 2010.*

\* cited by examiner

*Primary Examiner* — Anil Khatri
(74) *Attorney, Agent, or Firm* — DeLizio Gilliam, PLLC

(57) ABSTRACT

A virtual machine can be extended to be aware of secondary cores and specific capabilities of the secondary cores. If a unit of platform-independent code (e.g., a function, a method, a package, a library, etc.) is more suitable to be run on a secondary core, the primary core can package the unit of platform-independent code ("code unit") and associated data according to the ISA of the secondary core. The primary core can then offload the code unit to an interpreter associated with the secondary core to execute the code unit.

18 Claims, 4 Drawing Sheets ured by a developer. For example, the developer can insert an identifier

EXECUTING PLATFORM-INDEPENDENT CODE ON MULTI-CORE HETEROGENEOUS PROCESSORS

BACKGROUND

Embodiments of the inventive subject matter generally relate to the field of multi-core processors, and, more particularly, to executing platform-independent code on multi-core heterogeneous processors.

Multi-core heterogeneous processors consist of specialized cores with unique instruction set architectures (ISAs) and/or hardware architectures. Typically, a multi-core heterogeneous processor comprises a primary core for running general programs, such as operation systems, and multiple specialized secondary cores. The secondary cores may be optimized for handling graphics, mathematics, cryptography, etc. The primary core is responsible for offloading tasks to the secondary cores.

SUMMARY

Embodiments include a method directed determining that a unit of platform-independent code should be executed by a secondary core based on a capability of the secondary core. In some embodiments, the unit of platform-independent code can be packaged for the secondary core. The packaged unit of platform-independent code can be offloaded to a secondary interpreter associated with the secondary core to cause the secondary interpreter to execute the packaged unit of platform-independent code on the secondary core.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to IBM® Cell processors, embodiments may be implemented in other multi-core processors such as the IBM Xenon processor. In other instances, well-known instruction instances, protocols, structures, and techniques have not been shown in detail in order not to obfuscate the description.

Virtual machines that interpret platform-independent code execute on a primary core of a multi-core heterogeneous processor. The virtual machines executing on the primary core are not utilizing all of the processing power of the multi-core heterogeneous processor. Additionally, virtual machines are unaware of specific capabilities of the secondary cores. Therefore, the virtual machines do not use the resources of the secondary cores that may provide increased performance. For example, a secondary core may be capable of processing graphics twice as fast as the primary core. Because the virtual machine does not utilize the secondary core, graphics performance may suffer. A virtual machine can be extended to be aware of secondary cores and specific capabilities of the secondary cores. If a unit of platform-independent code (e.g., a function, a method, a package, a library, etc.) is more suitable to be run on a secondary core, the primary core can package the unit of platform-independent code ("code unit") and associated data according to the ISA of the secondary core. The primary core can then offload the code unit to an interpreter associated with the secondary core to execute the code unit.

Figure 1:
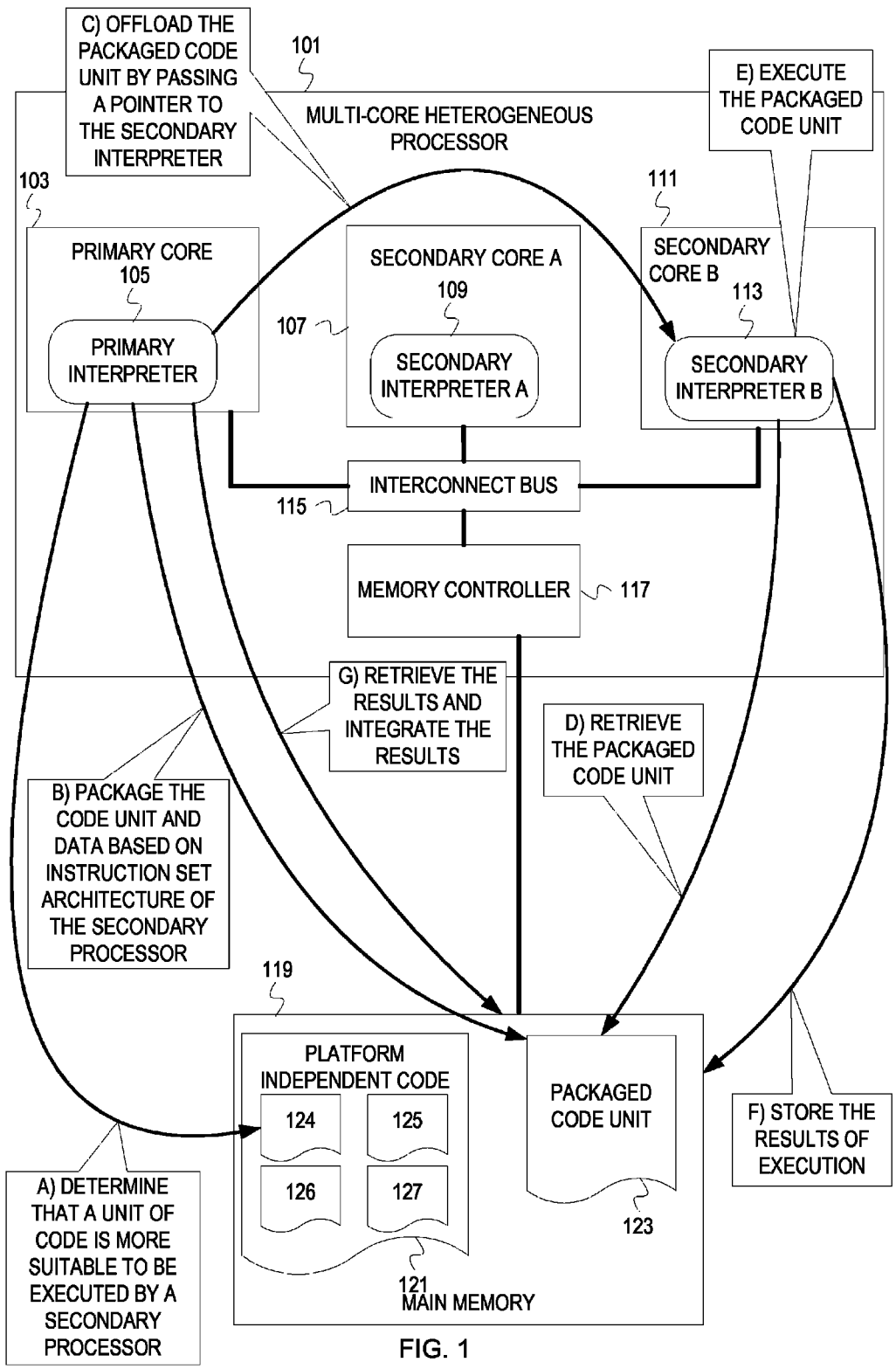
FIG. 1 is an example conceptual diagram of offloading a unit of platform-independent code to a secondary core.

FIG. 1 is an example conceptual diagram of offloading a unit of platform-independent code to a secondary core. A multi-core heterogeneous processor system 101 comprises a primary core 103, a secondary core A 107, a secondary core B 111, an interconnect bus 115, and a memory controller 117. For this illustration, the primary core 103, the secondary core A 107, and the secondary core B 111 have different ISAs and/or hardware architectures and are optimized for different types of tasks. The interconnect bus 115 communicatively connects the primary core 103, the secondary core A 107 and the secondary core 111 to each other and to the memory controller 117. The memory controller controls access to a main memory 119. A primary interpreter 105 is running on the primary core 103. A secondary interpreter A 109 is running on the secondary core A 107. A secondary interpreter B 113 is running on the secondary core B 111. Platform-independent code 121 is stored in the main memory. The platform independent code comprises code units 124, 125, 126, and 127. Code units 124, 125, 126, and 127 may be groups of instructions that constitute functions, methods, packages, libraries, etc.

The primary core 103 is optimized for running general applications such as operating systems and main application interfaces, while the secondary cores A 107 and B 111 are optimized for computation intensive tasks such as processing graphics, audio, mathematics, cryptography, video, etc. In this example, the multi-core heterogeneous processor 101 is utilized in a high definition television. So, the secondary core A 107 is optimized for processing graphics and video and the secondary core B 107 may be optimized for processing audio. The primary core 103 handles the basic functionality of the television such as changing channels, menu selections, volume controls, etc. Multi-core heterogeneous processors may be utilized in other electronic devices, such as personal computers, servers, mobile phones, portable music players, digital video disc (DVD) players, digital video recorders (DVRs), video game consoles, etc.

At stage A, the primary interpreter 105 is interpreting platform-independent code 121 and determines that the code unit 124 is more suitable to be executed by a secondary core. In this example, the primary interpreter 105 determines that the code unit 124 is more suitable to be executed by the secondary core B 111. Determining that the code unit 124 is more suitable for execution on a secondary core may comprise examining an identifier (e.g., a byte code, a tag, etc.) in the code unit 124. The identifier may be inserted manually by a developer. For example, the developer can insert an identifier in a function definition that indicates that the function relies heavily on math operations and should be executed on a core that is optimized for mathematics. The identifier may be inserted automatically when the platform-independent code is compiled. For example, an optimization engine of a justin-time compiler can determine that a method performs graphics manipulations and can insert an identifier indicating that the method should be executed on a core that is optimized for graphics.

The primary interpreter 105 can determine that the code unit 124 is more suitable to be run on the secondary core B 111 based on the capabilities of the secondary core B 111. At system start-up, the primary interpreter 105 can determine the capabilities and ISA of the secondary core A 107, and the secondary core B 111 by querying the secondary cores A 107 and B 111, reading a configuration file stored in memory or on a hard drive, etc. For example, a look-up table containing capabilities and ISA information for each secondary core can be stored at a particular address of a hard drive. The primary interpreter 105 can determine which secondary core is best suited for executing the code unit based on searching the look-up table for an identifier embedded in the code unit.

At stage B, the primary interpreter 105 packages the code unit 123 and associated data based on the ISA of the secondary core. The primary interpreter 105 then stores the packaged code unit 123 in main memory. For example, if the multi-core heterogeneous processor is a Cell processor, the primary interpreter can access the main memory 119 via load and store operations. The primary interpreter 105 stores the packaged code unit 123 in main memory 119 via a store operation. When packaging the code unit 123 for the secondary core B 111, the primary interpreter 105 may take into account data alignment, memory alignment, byte ordering, parameter passing mechanisms, stack alignment, pointer size, etc.

At stage C, the primary interpreter 105 offloads the packaged code unit 123 by passing to the secondary interpreter B 113 a pointer to the packaged code unit 123. The pointer indicates the starting address of the packaged code unit 123 and its associated data in the main memory 119. The primary interpreter 105 may pass multiple references to the secondary interpreter B 113. For example, the primary interpreter passes a pointer to the packaged code unit 123 and a second pointer to the data because the packaged code unit 123 and the data are stored at different addresses in the main memory 119.

At stage D, the secondary interpreter B 113 retrieves the packaged code unit 123 from the main memory 119. For example, if the multi-core heterogeneous processor is a Cell processor, secondary cores access the main memory 119 via direct memory access (DMA). The secondary interpreter B 113 retrieves the packaged code unit 123 from the main memory 119 through a direct memory access (DMA) and stores the packaged code unit 123 in a local store of the secondary core B 111. Depending on the length of the packaged code unit 123 and the size of the local store, the secondary interpreter B may retrieve sections of the packaged code unit 123 at different times.

At stage E, the secondary interpreter B 113 executes the packaged code unit 123 on the secondary core B 111. Executing the packaged code unit 123 may comprise translating the packaged code unit 123 into an intermediate representation, generating machine code from the packaged code unit 123 (i.e., just-in-time compiling), interpreting the packaged code unit 123, etc.

At stage F, the secondary interpreter 113 stores the results of execution in main memory 119. The secondary interpreter 113 may store the results in the data section of the packaged code unit 123 or in another location specified in the packaged code unit (e.g., a stack). For example, the secondary interpreter 113 performs a DMA write to the main memory 119 to store the results.

At stage G, the primary interpreter 105 retrieves the results from the main memory 119. For example, the primary interpreter 105 retrieves the results from the main memory 119 via a load operation. Then, the primary interpreter 105 integrates the results into the main execution. The results may be integrated synchronously or asynchronously. The primary interpreter 105 may execute or offload to another secondary core a second unit of code after offloading the packaged code unit 123 if the second code unit code does not depend on the results of executing the packaged code unit 123. When the second code unit depends on results of the packaged code unit 123, the primary interpreter 105 may have to wait for the results before proceeding. In this example, the primary interpreter 105 retrieves the results from the main memory 119, but embodiments are not so limited. As another example, the primary core 105 may read an output of the secondary interpreter 113 via the interconnect bus 115.

Although examples refer to heterogeneous multi-core processors with each core following a different ISA, embodiments are not so limited. A heterogeneous multi-core processor may have two or more cores that follow the same ISA. For example, a heterogeneous multi-core processor comprises four cores, a primary core and three secondary cores. The ISA of the primary core is different from the ISAs of the three secondary cores, but two of the secondary cores have the same ISA.

Figure 2:
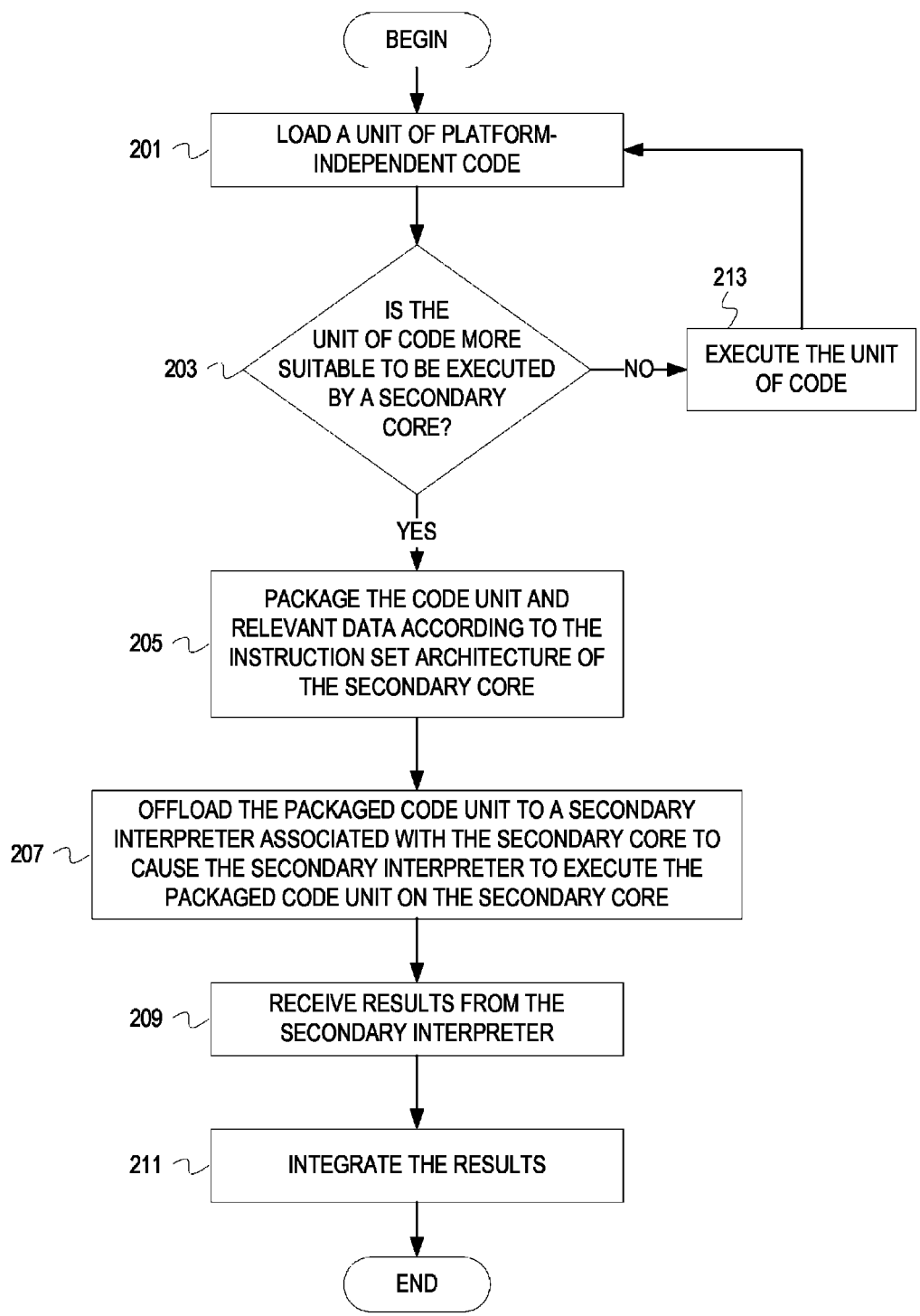
FIG. 2 depicts a flowchart of example operations for offloading a unit of platform-independent code to a secondary core.

FIG. 2 depicts a flowchart of example operations for offloading a unit of platform-independent code to a secondary core. Flow begins at block 201, where a primary interpreter associated with a primary core loads a unit of platform-independent code. Loading a unit of platform-independent code may be in response to an application launch, a function or method call, a context switch, etc.

At stage 203, it is determined if the code unit is more suitable to be executed by a secondary core. Determining if the code unit is more suitable for execution on a secondary core comprises determining functionality of the code unit and determining that capabilities of a secondary core indicate that the secondary core is optimized for the functionality. For example, the function of the code unit may be file encryption, so the primary core determines that the code unit would be more suitable to be executed on a core that is optimized for cryptography and/or mathematics. Determining the functionality of the code unit may be based on an identifier embedded in the code unit. The identifier may be embedded by a compiler, an optimization engine, a developer, etc. The primary interpreter may determine that a code unit is more suitable for a secondary core on-the-fly. For example, the primary interpreter may utilize a just-in-time compiler to determine if a secondary core is more suited to process the code unit based on functionality of the code unit. The primary interpreter may determine that a code unit is more suitable for a secondary core in advance. For example, the primary interpreter may walk through the platform-independent code to determine which code units can be offloaded and mark the code units to identify a suitable secondary core. The primary interpreter may also determine dependencies between code units. If the code unit is more suitable to be executed by a secondary core, flow continues at block 205. If the code unit is not suitable to be executed by a secondary core, flow continues at block 213.

At block 205, the code unit and relevant data is packaged according to the ISA of the secondary core. Packaging the code unit comprises transforming instructions and data in the code unit to conform to the ISA of the secondary core. For example, the data byte ordering of the secondary core is big endian, but the data byte ordering of the primary core is little endian. The primary core changes the byte ordering of the data from little endian to big endian when packaging the code unit.

At block 207, the packaged code unit is offloaded to a secondary interpreter associated with the secondary core to cause the secondary interpreter to execute the package code unit on the secondary core. Offloading the packaged code may comprise passing a pointer indicating the beginning of the packaged code unit to the secondary interpreter, writing the packaged code unit into to a block of memory assigned to the secondary interpreter, etc. The primary core may launch a thread to handle packaging and offloading of the code unit so that the primary core may continue interpreting and/or offloading other code units.

At block 209, results from the secondary interpreter are received. Receiving the results may comprise retrieving the results from a main memory, reading an output of the secondary core, etc. The primary interpreter may utilize threading, so that the primary interpreter can continue interpreting and/or offloading other code units while waiting for the secondary core to return results. Embodiments can also interrupt the primary interpreter when results are generated from a secondary core. Embodiments can also store results from a secondary core and set a bit to inform the primary core of the results.

At block 211, the results are integrated and flow ends. The results may be integrated synchronously when a code unit depends on results from another code unit. For example, the primary core receives the results and passes the results along to another secondary core whose second offloaded code unit depends on the results. In this case, the primary core previously instructed the secondary core that the code unit is dependent and the secondary core may stall until it receives the results. The results may be integrated asynchronously when there is a least one code unit that does not depend on the results. For example, a primary interpreter launches a new thread to offload a code unit to a secondary core and wait for the results. The primary core then determines that a second code unit is not dependent. So, the primary core can interpret the second code unit or offload the second code unit to a second secondary interpreter without waiting for the results or instructing the second secondary interpreter to wait. As another example, the primary interpreter may have multiple sets of results from different secondary cores. The primary interpreter can assimilate these multiple sets of results in accordance with various techniques (e.g., markers associated with each of the sets of results, where the results are stored, etc.).

At block 213, the code unit is not suitable to be executed by a secondary core, so the primary core executes the unit of code and flow returns to block 201.

Although examples refer to the secondary core returning results to the primary core, embodiments are not so limited. For example, a primary core offloads two code units to two secondary cores. The second code unit depends on results from the first code unit. Instead of returning results to the primary core, the first secondary core may return the results directly to the second secondary core.

Figure 3:
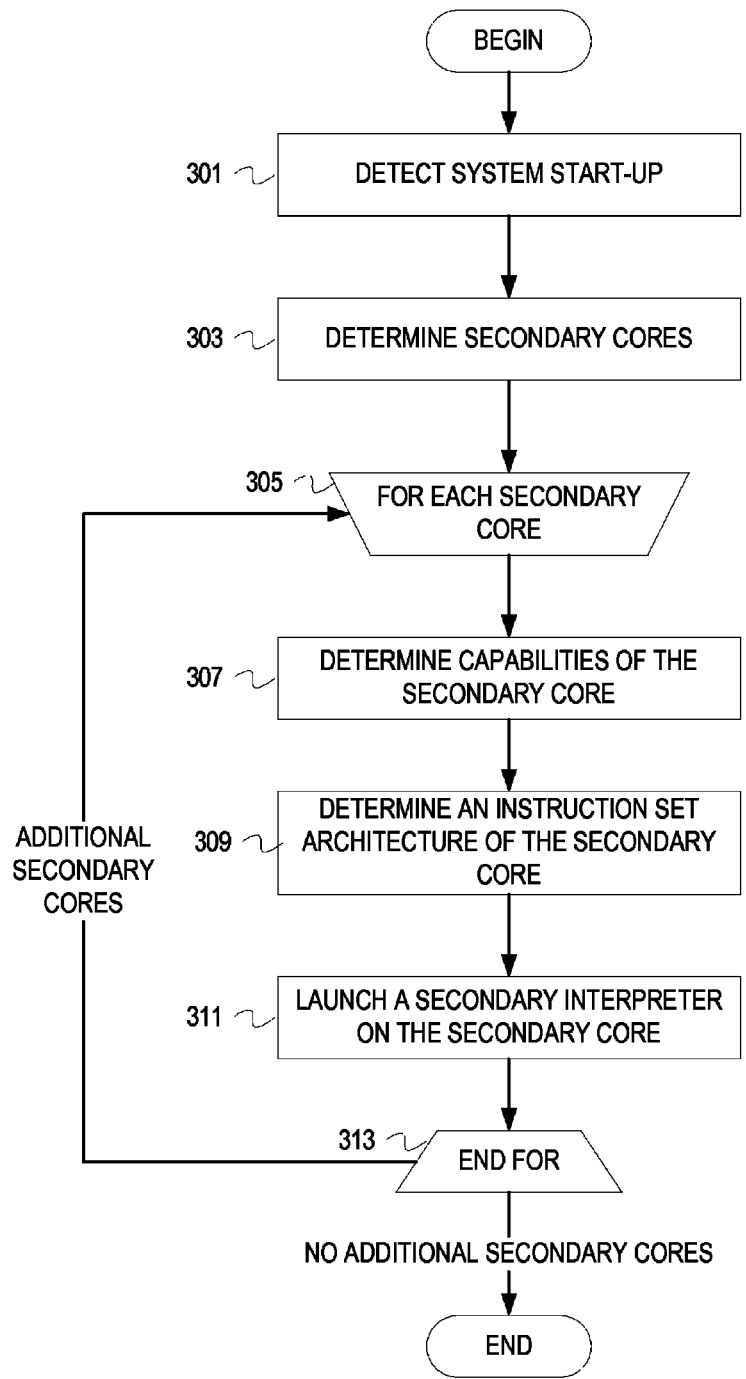
FIG. 3 depicts a flowchart of example operations for determining capabilities of the secondary cores and launching secondary interpreters on the secondary cores.

To determine that a unit of code is more suitable to be executed on a secondary core, the primary core utilizes knowledge of the capabilities of each secondary core. At startup, the primary interpreter can launch secondary interpreters on the secondary cores to execute the offloaded platform-independent code units. FIG. 3 depicts a flowchart of example operations for determining capabilities of the secondary cores and launching secondary interpreters on the secondary cores. Flow begins at block 301, where a primary interpreter detects system start-up.

At block 303, secondary cores are determined. For example, the secondary cores are determined based on a start-up configuration file.

At block 305, a loop begins for each secondary core.

At block 307, capabilities are determined for the secondary core. For example, the primary core queries the secondary core for the secondary core's configuration file.

At block 309, an ISA of the secondary core is determined. For example, the primary core loads a look-up table from a particular memory location and searches the table for an identifier of the secondary core to retrieve the secondary core's ISA from the table.

At block 311, a secondary interpreter is launched on the secondary core. For example, the primary core writes code corresponding to the secondary interpreter in a reserved memory block of the secondary core.

At block 313, the loop for each secondary core ends.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, another unit of code may be loaded by the primary interpreter in FIG. 2, before the primary interpreter receives results from the secondary interpreter. Referring to FIG. 3, the operations for determining the capabilities of the secondary core and determining the ISA of the secondary core may be interchanged.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
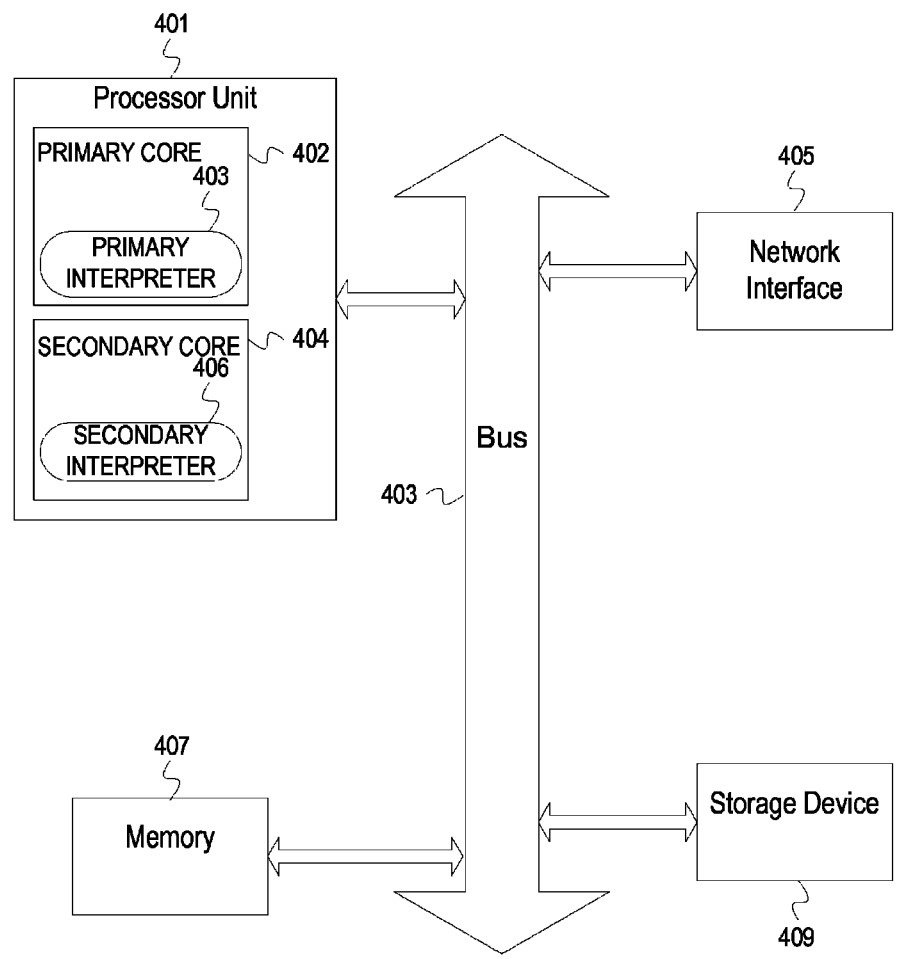
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The processor unit 401 comprises a primary core 402 and a secondary core 404. The primary core 402 comprises a primary interpreter 403 and the secondary core 404 comprises a secondary interpreter 406. The primary interpreter 403 loads a unit of platform-independent code and determines if the unit of platform-independent code is more suitable to be executed by the secondary core 404. If the unit of platform-independent code is more suitable to be executed by the secondary core 404, the primary interpreter 403 packages the unit of platform-independent code according to the instruction set architecture of the secondary core 404, and offloads the packaged code unit to the secondary interpreter 406. The secondary interpreter 406 executes the packaged code unit, and returns results to the primary interpreter 403. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for executing platform-independent code on multi-core heterogeneous processors as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter.

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
while a first interpreter on a primary core processes platform-independent code that includes a plurality of code units, determining functionality of a first code unit of the plurality of code units and determining that a secondary core in a multi-core heterogeneous processor is indicated as more suitable to perform the functionality than another core in the multi-core heterogeneous processor, wherein said determining that the secondary core is indicated as more suitable to perform the functionality than another core in the multi-core heterogeneous processor is based, at least in part, on accessing a structure that indicates capabilities of cores of the multi-core heterogeneous processor;
packaging the first code unit for the secondary core in response to said determining that the capabilities of the secondary core are indicated as more suitable to perform the functionality,
wherein said packaging the first code unit comprises transforming instructions and data of the first code unit to conform with an instruction set architecture of the secondary core,
wherein said packaging generates a packaged unit of platform-independent code; and
offloading the packaged unit of platform-independent code to a secondary interpreter associated with the secondary core.

2. The method of claim 1, wherein said determining functionality of the first code unit comprises determining that the first code unit of platform-independent code has a functionality indentifier that indicates one of graphics processing, audio processing, mathematics processing, video processing, and cryptographic processing, and wherein said determining that the capabilities of the secondary core are indicated as more suitable to perform the functionality comprises determining that a capability identifier of the secondary core that corresponds to the functionality identifier.

3. The method of claim 1, wherein said determining the functionality of the first code unit comprises the primary core examining an identifier in the first code unit.

4. The method of claim 1, wherein said further comprising determining a capability of the secondary core based on, at least one of, querying the secondary core, and reading a configuration file, wherein said determining that the secondary core is indicated as more suitable to perform the functionality than another core in the multi-core heterogeneous processor is based, at least in part, on accessing the a structure that indicates capabilities of cores of the multi-core heterogeneous processor comprises, at least one of, querying the secondary core and reading a configuration file.

5. The method of claim 1, further comprising:
determining the instruction set architecture of the secondary core based on, at least one of, querying the secondary core, and reading a configuration file.

6. The method of claim 1 further comprising executing the packaged unit of platform-independent code on the secondary core.

7. The method of claim 1 further comprising:
- determining that a second code unit of the plurality of code units of the platform-independent code does not depend on a result of executing the packaged unit of platform-independent code;
- determining that a second secondary core in the multi-core heterogeneous processor is indicated as more suitable to perform functionality of the second code unit than the secondary core;
- packaging the second code unit of platform-independent code for the second secondary core, wherein said packaging the second code unit of platform-independent code generates a second packaged unit of platform-independent code; and
- offloading the second packaged unit of platform-independent code to a second secondary interpreter associated with the second secondary core.

8. The method of claim 1 further comprising:
- determining that a second code unit of platform-independent code depends on a result of executing the packaged unit of platform independent code;
- determining that a second secondary core in the multi-core heterogeneous processor is indicated as more suitable to perform functionality of the second code unit than the secondary core;
- packaging the second code unit of platform-independent code for the second secondary core, wherein said packaging the second unit of platform-independent code generates a second packaged unit of platform-independent code;
- receiving the result from the secondary interpreter;
- passing the result to a second secondary interpreter; and
- offloading the second packaged unit of platform-independent code to the second secondary interpreter associated with the second secondary core.

9. One or more machine-readable storage media having stored therein program instructions configured to:
- load a first code unit of a plurality of code units of a platform-independent code;
- determine functionality of the first code unit of platform-independent code;
- determine that a first secondary core of a plurality of secondary cores in a multi-core heterogeneous processor is optimized for the functionality, wherein the program instructions configured to determine that the first secondary core of the plurality of secondary cores is optimized for the functionality comprises the program instructions configured to determine capabilities of the plurality of secondary cores;
- package the first code unit of platform-independent code for the first secondary core; and
- offload the packaged first code unit of platform-independent code to a secondary interpreter associated with the first secondary core to cause the secondary interpreter to execute the packaged first code unit of platform-independent code on the secondary core.

10. The machine-readable storage media of claim 9, wherein the program instructions configured to determine functionality of the first code unit of platform-independent code comprises the program instructions configured to examine the types of operations in the first code unit of platform-independent code.

11. The machine-readable storage media of claim 9, wherein the program instructions configured to offload the packaged first code unit of platform-independent code to the secondary interpreter associated with the first secondary core comprises program instructions configured to, at least one of, pass a pointer to the packaged first code unit of platform-independent code to the secondary interpreter, and write the packaged first code unit of platform-independent code into a block of memory assigned to the secondary interpreter.

12. The machine-readable storage media of claim 9, wherein the program instructions configured to package the first code unit of platform-independent code for the first secondary core comprises the program instructions configured to transform the first code unit to conform to, at least one of, data alignment, memory alignment, byte ordering, parameter passing mechanisms, stack alignment, and pointer size of an instruction set architecture of the first secondary core.

13. The machine-readable storage media of claim 9 further comprising program instructions configured to:
- load a second code unit of the platform independent code;
- determine that the second code unit of platform-independent code does not depend on results of executing the packaged first code unit;
- determine functionality of the second code unit of the platform-independent code;
- determine that a second secondary core of the plurality of secondary cores is optimized for the functionality of the second code unit;
- package the second code unit of the platform-independent code for the second secondary core;
- offload the packaged second code unit of the platform-independent code to a second secondary interpreter associated with the second secondary core to cause the second secondary interpreter to execute the packaged second code unit of the platform-independent code on the second secondary core.

14. An apparatus comprising:
- a memory; and
- a multi-core heterogeneous processing unit coupled with the memory, the multi-core heterogeneous processing unit comprising a primary core and a secondary core;
- a machine-readable storage media having program instructions stored therein, the program instructions configured to,
- determine a functionality indication of for each of a plurality of code units of a platform-independent code;
- at least one of, query the secondary core and read a configuration file to determine a capability indication of the secondary core;
- for each functionality indication, determine whether the capability indication of the secondary core corresponds to the functionality indication;
- in response to a determination that the capability indication of the secondary core corresponds to the functionality indication, package the code unit of the plurality of code units of the platform-independent code that corresponds to the functionality indication for the secondary core, wherein the program instructions configured to package the code unit comprises program instructions configured to generate a packaged code unit of platform-independent code, and
- offload the packaged code unit of platform-independent code to the secondary core.

15. The apparatus of claim 14, wherein the functionality indication indicates one of graphics, audio, mathematics, video, and cryptography.

16. The apparatus of claim 14, wherein the program instructions configured to package the code unit of platform-independent code for the secondary comprises the program instructions configured to,
- determine an instruction set architecture of the secondary core; and transform the code unit to conform to the instruction set architecture of the secondary core.

17. The apparatus of claim 14, further comprising program instructions configured to:
  determine that a second code unit of platform-independent code does not depend on a result of executing the packaged code unit of platform-independent code;
  determine that the functionality indication of the second code unit corresponds to a capability indication of a second secondary core of the multi-core heterogeneous processor, wherein the capability indication of the secondary core is different than the capability indication of the second secondary core;
  package the second code unit of platform-independent code for the second secondary core to generate a second packaged code unit of platform-independent code; and
  offload the second packaged code unit of platform-independent code to said second secondary core for processing.

18. The apparatus of claim 14, further comprising program instructions configured to:
  determine that a second code unit of platform-independent code depends on a result of executing the packaged code unit of platform-independent code;
  determine that the functionality indication of the second code unit corresponds to a capability indication of a second secondary core of the multi-core heterogeneous processor, wherein the capability indication of the secondary core is different than the capability indication of the second secondary core;
  package the second code unit of platform-independent code for the second secondary core to generate a packaged second code unit;
  receive the result from the secondary core;
  pass the result to the second secondary core; and
  offload the packaged second code unit of platform-independent code to the second secondary core for processing.

* * * * *